Feb. 7, 1956     W. S. PRAEG     2,733,641
GEAR FINISHING
Filed June 4, 1951     4 Sheets-Sheet 2
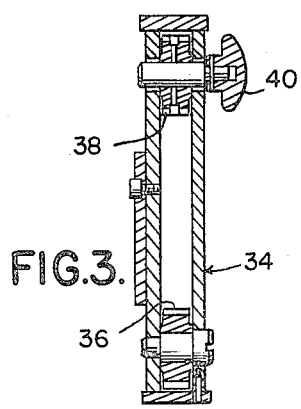
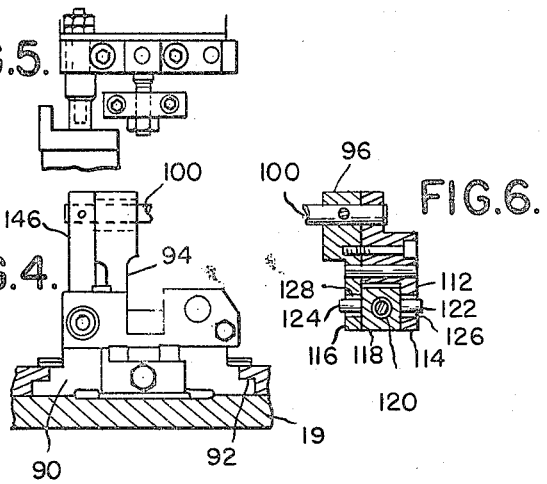
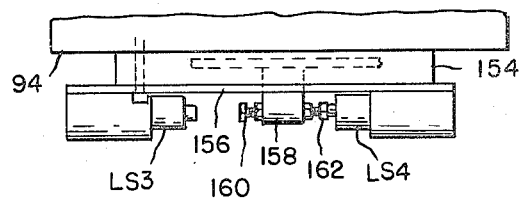
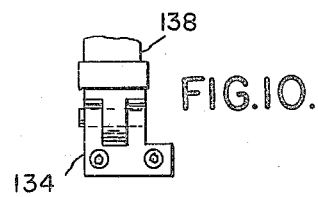
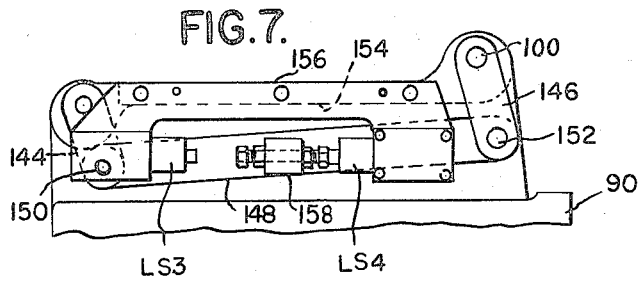
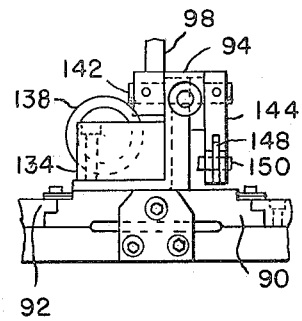
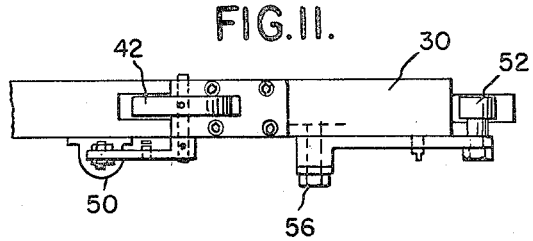
INVENTOR.
WALTER S. PRAEG
BY *Whittemore,*
*Hulbert & Belknap*
ATTORNEYS Feb. 7, 1956  W. S. PRAEG  2,733,641
GEAR FINISHING
Filed June 4, 1951  4 Sheets-Sheet 3
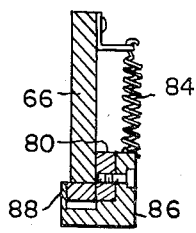
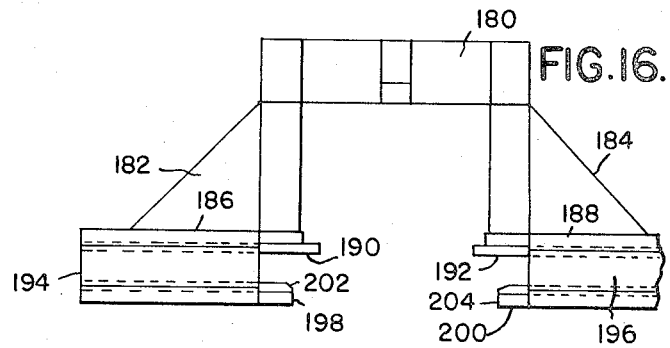
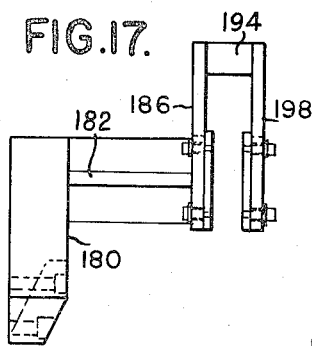
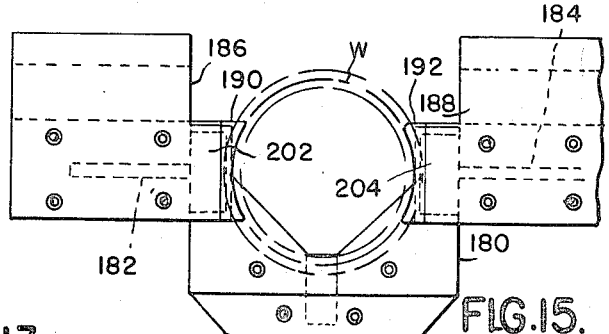
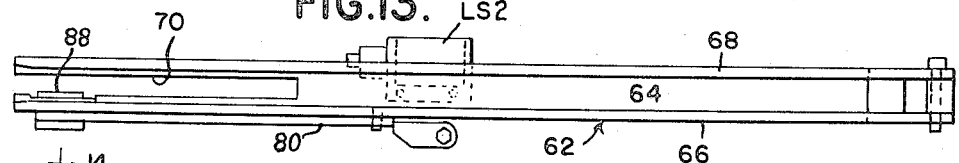
INVENTOR.
WALTER S. PRAEG
BY Whittemore,
Hulbert & Belknap
ATTORNEYS

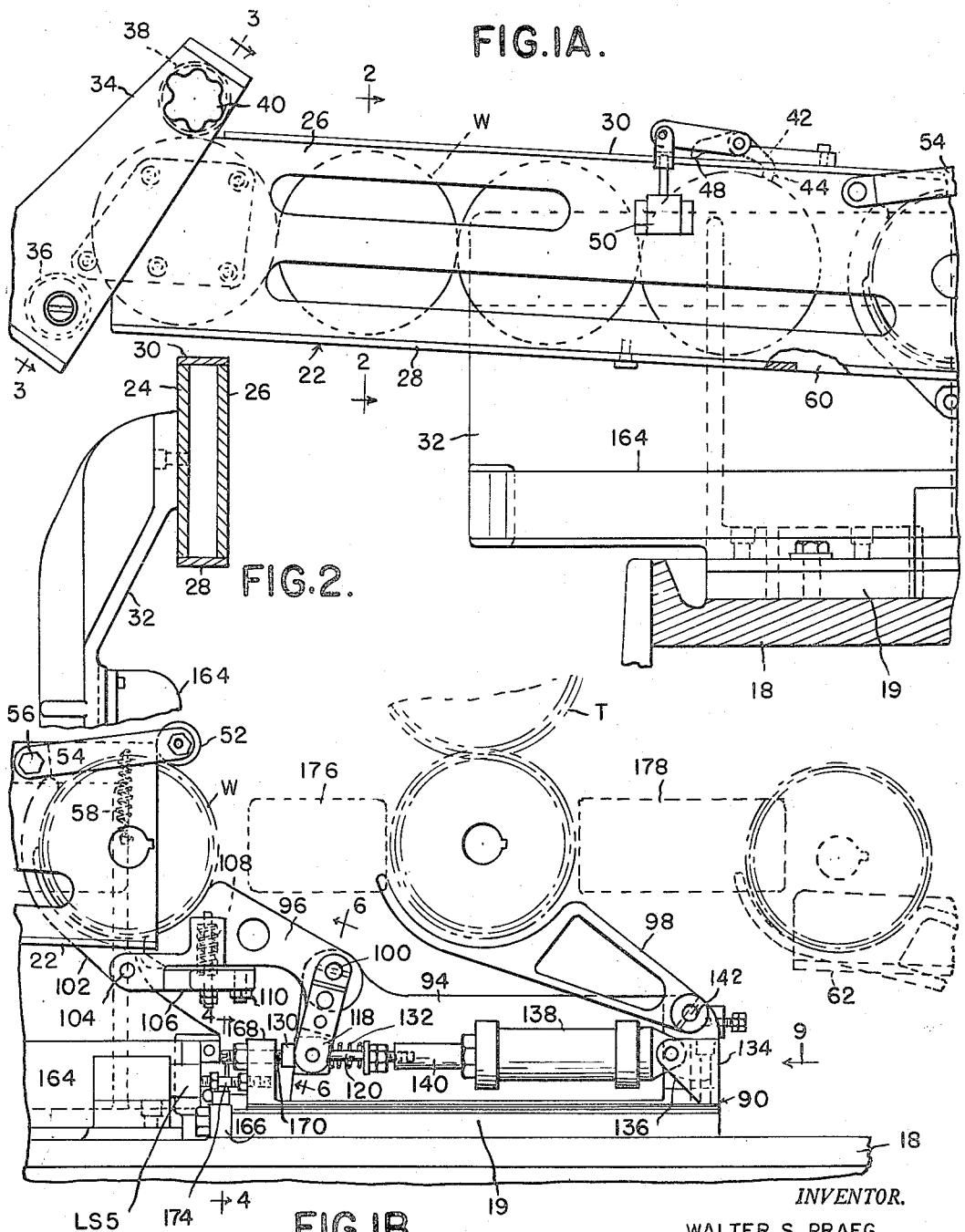

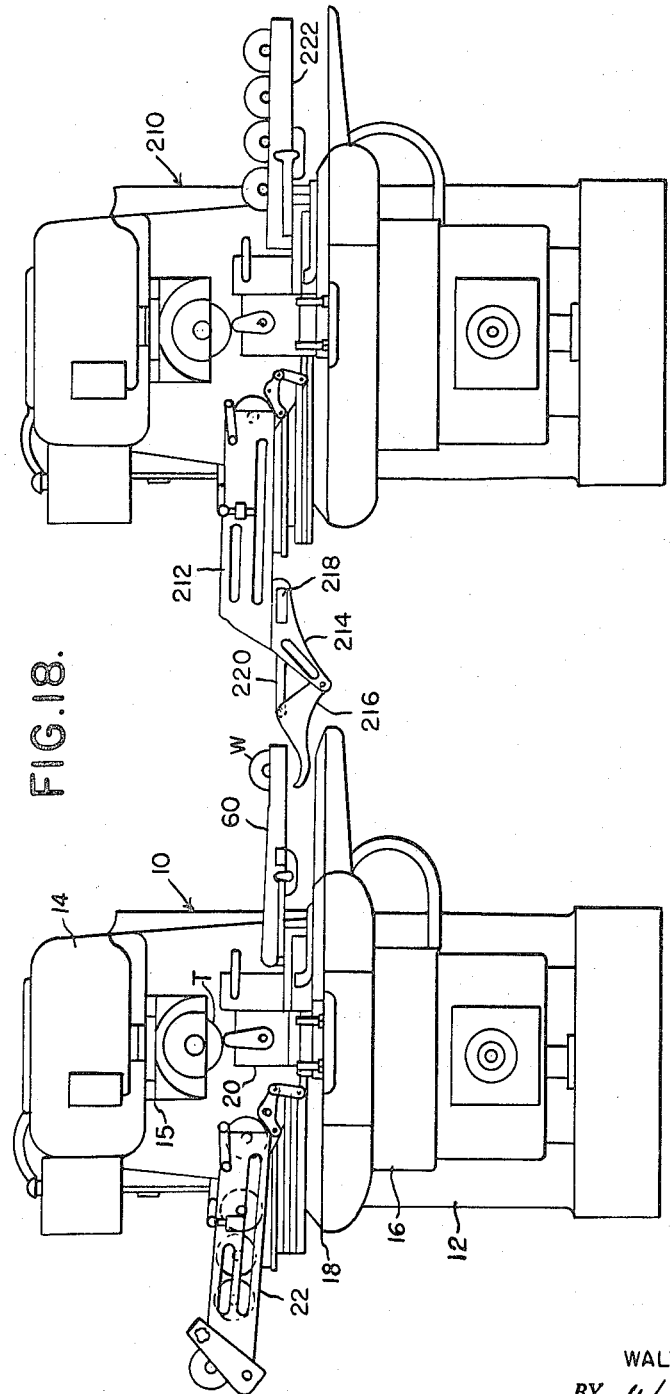

United States Patent Office 2,733,641
Patented Feb. 7, 1956

2,733,641
GEAR FINISHING

Walter S. Praeg, Detroit, Mich., assignor to National Broach & Machine Company, Detroit, Mich., a corporation of Michigan Application June 4, 1951, Serial No. 229,841

16 Claims. (Cl. 90—1)

The present invention relates to gear finishing equipment, and more particularly to automatic equipment effective to finish a plurality of gears without requiring the help of an operator.

It is an object of the present invention to provide a gear finishing machine having a rotary gear-like finishing tool, rotary supporting means adjacent the tool operable to engage and release a work gear after the work gear has been properly positioned in mesh with the tool, and means for periodically advancing an unfinished work gear to the working station and for removing a finished gear from the working station.

It is a further object of the present invention to provide a gear finishing machine adapted to sequentially advance a gear to the working station and to advance the finished gear away from the working station, the advance movements of the gear being substantially in the same direction.

It is a further object of the present invention to provide a plurality of gear finishing machines each of which includes means for automatically advancing a work gear to the working station and for advancing the work gear away from the working station after the finishing operation in which the machine performing the first operation on the gear supplies the finished or partially finished gear to the next machine in condition for further automatic operation.

It is a feature of the present invention to provide automatic loading equipment for a gear finishing machine of the type having a rotary gear-like finishing tool, and gear supporting means operable to engage and release a work gear, the gear supporting means being adjacent the tool in position to engage a work gear properly located in working position in meshed relation with the tool, the automatic loading equipment including a supply chute and a receiver chute, said chutes being in substantial alignment and spaced apart at opposite sides of the working station, a reciprocable slide located beneath the adjacent ends of said chutes, gear supporting devices on said slide, mechanism for raising and lowering said devices to engage and release work gears, and mechanism for reciprocating said slide back and forth to effect advance movement of work gears from the supply chute to working position and from working position to the receiver chute.

Other objects and features of the invention will become apparent as the description proceeds, especially when taken in conjunction with the accompanying drawings, wherein:

Figure 1A is a side elevation of the left hand end of automatic loading equipment associated with a gear finishing machine.

Figure 1B is a front elevational view of the right hand end of the same mechanism, Figures 1A and 1B together comprising a complete front elevational view of the equipment.

Figure 2 is a sectional view on the line 2—2, Figure 1A.

Figure 3 is a section on the line 3—3, Figure 1A.

Figure 4 is a sectional view substantially on the line 4—4, Figure 1B.

Figure 5 is a fragmentary plan view showing the connection between the left hand end of the slide and the actuating power cylinder and associated mechanism.

Figure 6 is a section on the line 6—6, Figure 1B.

Figure 7 is a fragmentary rear elevational view of the slide.

Figure 8 is a fragmentary plan view of the slide.

Figure 9 is a fragmentary end elevation of the mechanism looking in the direction of the arrow 9, Figure 1B.

Figure 10 is a fragmentary plan view of the mechanism illustrated in Figure 9, showing the connection to the power cylinder.

Figure 11 is a fragmentary plan view of the right hand end of the supply chute.

Figure 12 is a front elevational view of the receiver chute.

Figure 13 is a plan view of the receiver chute shown in Figure 12.

Figure 14 is a fragmentary sectional view on the line 14—14, Figure 12.

Figure 15 is a front elevational view of guide rail and stripper structure mounted on the gear finishing machine.

Figure 16 is a plan view of the structure shown in Figure 15.

Figure 17 is a side elevational view of the structure shown in Figure 15.

Figure 18 is a more or less diagrammatic elevational view illustrating the manner in which a plurality of gear finishing machines are interconnected, employing the automatic loading equipment disclosed herein, to provide a fully automatic sequence of different operations on the same gears.

The automatic loading equipment disclosed herein is designed particularly for use with a gear finishing machine of the type disclosed at 10 in Figure 18. A gear finishing machine of this type comprises a main frame or column 12 including an overhanging portion 14 at the front which supports a gear-like finishing tool for rotation. Suitable means 15 is provided for effecting angular adjustment of the tool T about a vertical axis and for driving the tool in rotation. A gear finishing machine of this type is disclosed in application Serial No. 694,590, Patent No. 2,612,080 of Kenneth J. Davis, assigned to the assignee of the present application.

The gear finishing machine includes a vertically adjustable knee 16 and a table 18 to which is secured a fixture supporting base plate 19 carrying centers or other suitable gear supporting means for supporting a gear for rotation in meshed engagement with the tool T. Intermediate the knee 16 and the table 18 are a pair of ways providing for reciprocation of the table 18 in a horizontal plane. These ways are angularly adjustable about a vertical axis so that reciprocation of the table 18 may take place in any direction in the horizontal plane.

The knee 16 and table 18 project forwardly from the main frame 12 beneath the overhanging top portion 14 and accordingly, space is provided between the overhanging portion 14 and the table 18 for movement of a gear in the same direction from left to right without interference with machine parts.

In accordance with the present invention the mechanism for supporting the tool T is adjusted so that the axis of the tool extends generally from front to back of the machine although inclined from such direction by an amount equal to the desired angle between the axis of the gear and tool during the gear finishing operation.

The gear finishing operation contemplated herein is crossed axes gear finishing in which the gear and tool are rotated in mesh with their axes crossed at a relatively small angle, for example between 3 and 30 degrees, while a relative reciprocation takes places between the gear and tool in a plane parallel to the axes of both gear and tool and preferably in a direction which makes a substantial angle to the axes of both the gear and tool.

The work supporting means is indicated at 20 and includes a center or centers for engaging a work gear and means for actuating the work supporting means to engage or release the work gear.

In Figure 18 the gear finishing machine is illustrated as having associated therewith a supply chute 22 and reference is now made to Figures 1—11 for a detailed description of the automatic loading mechanism including the supply chute 22.

As seen in these figures, the supply chute 22 comprises side plates 24 and 26, a bottom plate 28, and a top plate 30 interconnected to define a rectangular passage through which work gears W may roll. The chute 22 is supported by a bracket structure 32 bolted to a portion of the plate 19.

Preferably, the supply chute 22 includes a sizing gauge 34 carrying an adjustably mounted sizing gear 36 and a second sizing gear 38 connected to a hand wheel 40 for rotation. The arrangement is such that work gears W are required to pass between the gears 36 and 38 so that oversize gears cannot enter the supply chute 22. The supply chute 22 is inclined at a small angle so that the gears W roll by gravity down to the chute to the gear finishing machine. A stop lever 42 is pivoted to the top plate 30 and has depending fingers 44 and 48 adapted to operate through an opening in the top plate 30 so as to engage gears W. Power means, such for example as an air cylinder 50, is provided for rocking the lever 42. The arrangement is such that as the cylinder 50 is energized to rock the lever 42 in a counterclockwise direction as seen in Figure 1A, the gear W engaged by the fingers 44 will roll forward while the fingers 48 will arrest forward movement of the following gear. Upon reverse rocking of the lever 42 the gear engaged by the fingers 48 may move forwardly by only a limited amount as determined by its engagement with the fingers 44.

The gear W released by the fingers 44 rolls along the chute until its forward motion is arrested by engagement with a roller 52 carried by a lever 54 which is pivoted to the side of the chute as indicated at 56. A relatively light tension spring 58 is provided biasing the roller 52 downwardly with such force to arrest gravitational movement of the gear W but permitting further movement of the gear as brought about by mechanism later to be described.

The gear W is thus fixed in a preliminary or loading position by the roller 52. Adjacent the right hand or discharge end of the supply chute 22 the bottom wall 28 thereof is cut away to provide a central slot 60 through which gear supporting devices, later to be described, may operate to engage the underside of the gear and to support the same for subsequent advance movement.

Referring now to Figures 12-14 there is illustrated the receiver chute indicated generally at 62, which comprises a bottom plate 64, and side plates 66 and 68. The bottom plate 64 adjacent the left hand end, as seen in Figure 13, is provided with an elongated slot 70 through which the gear supporting devices operate. Again, the receiver chute 62 is supported by a mounting bracket 72 carried on the plate 19. The discharge end of the receiver chute 62 is provided with an abutment 74 to arrest the first gear received in the receiver chute. Subsequent gears are brought to rest by engagement with gears previously deposited in the receiver chute.

In order to arrest operation of the machine when the receiver chute has been filled with gears, a limit switch LS1 is provided which is secured to the side plate 66 of the receiver chute and has an actuator 76. Pivoted to a side wall of the chute as indicated at 78, is a lever 80 having a finger 82 extending below the actuator 76 in position to trip the actuator under predetermined operating conditions. A light tension spring 84 is connected to the lever 80 and biases the same in a clockwise direction, as seen in Figure 12. The lever 80 adjacent the end thereof carries a block 86 best seen in Figure 14. The block 86 includes an upstanding finger 88 adapted to enter into the slot 70 to be engaged by a gear in the receiver chute 62. In the normal operation of the machine gears finished by the gear finishing tool are deposited in the receiver chute and rolled downwardly therein. As the gears are advanced into the open end of the chute they may or may not engage the finger 88 to actuate limit switch LS1. However, in the event that they do actuate the limit switch LS1, such actuation is momentary and the gears roll beyond the finger 88, leaving the control equipment of the machine in condition for further automatic operation. However, when the chute becomes full a finished gear is retained in position directly over the finger 88 with the result that the automatic cycling of the machine is terminated.

The receiver chute 62 also is employed as a support for a limit switch LS2 adapted to be engaged by a portion of the slide, as will subsequently be described, to enter into the automatic cycling of the machine.

The mechanism for advancing an unfinished work gear from its preliminary position as determined by engagement with the roller 52 into working position, and for advancing a finished gear from working position and depositing it in the receiver chute 62 will now be described. This mechanism comprises a slide 90. Mounted in suitable ways indicated generally at 92, on the table 18, the slide 90 includes an upstanding web 94 to which are pivoted a loading arm 96 and an unloading arm 98. The loading arm 96 is pivoted to the web 94 by a pivot pin 100 and is shaped at its outer end to interfit with the periphery of the gear W located in the preliminary or loading position. Adjacent the outer end of the loading arm 96 is a lever 102 pivoted thereto by a pin 104 and including a lever arm 106. A compression spring 108 is provided intermediate the loading arm 96 and the lever arm 106, biasing the lever 102 in a clockwise direction as seen in Figure 1B. This results in establishing a frictional grip between the inner concave surfaces of the loading arm 96 and the lever 102 with the periphery of the gear W. The lever arm 106 includes an adjustable abutment screw 110 which limits the swinging movement of the lever 102.

As best seen in Figures 4 and 6, the loading arm 96 is bolted and pinned to an actuating lever 112 which is provided with an offset portion 114 spaced from a depending portion 116 on loading arm 96 to provide a space therebetween for receiving a block 118 connected to a piston rod extension 120. The block 118 is provided with diametrically oppositely extending pins 122 and 124 received in enlarged openings 126 and 128 respectively. The piston rod extension 120 is provided with an abutment 130 (Figure 1B) and the block 118 is normally held against the abutment 130 by a compression spring 132.

The slide 90 is provided with a supporting body 134 (Figure 9) including spaced ears 136 (Figure 1B) between which is pivoted a fluid cylinder 138, the cylinder having a piston thereon (not shown) connected to the piston rod 140. Accordingly, movement of the piston in the cylinder 138 results in rocking movement of the loading arm 96 and the limits of movement are such that the arm 96 and its lever 102 move from the position shown in Figure 1B to a clearance position in which all parts thereof extend below the lower portion of the work gears W to permit reciprocation of the slide 90 without engagement with the work gears.

The unloading arm 98, as best seen in Figure 9, is keyed to a pivot pin 142 which extends through the web 94 where it in turn is pinned to a lever 144. Means are provided for rocking the loading and unloading arms simultaneously and this means comprises a lever 146 rigidly secured to the pivot pin 100 at the opposite side of the web 94 from the loading arm 96, as best seen in Figure 4.

Referring now to Figure 7 the lever 146 is connected to the lever 144 by a link 148, the link being connected to the lever 144 by a pivot pin 150 and to the lever 146 by a pivot pin 152. Accordingly, rocking movement imparted to the loading arm 96 by the action of the fluid cylinder 138, effects simultaneous rocking movement of both arms 96 and 98.

Referring now particularly to Figures 7 and 8, control mechanism is associated with the link 148. As seen in these figures, a horizontally extending plate 154 is connected to the web 94 and depending therefrom is a supporting plate 156. Bolted or otherwise secured to the plate 156 are a pair of limit switches LS3 and LS4. Secured to the link 148 is a block 158 carrying a pair of adjustable abutments 160 and 162 for actuation of limit switches LS3 and LS4 respectively.

Secured to the table 18 is an air cylinder 164 which is coupled to the slide 90 for effecting back and forth reciprocation theerof. Mounted on the table 18 is a slide stop 166 adapted to be engaged by the slide 90 to limit movement thereof to the left as seen in Figure 1B. A corresponding stop (not shown) is provided for arresting its movement to the right. Carried at the left hand end of the slide is a stop block 168 carrying an adjustable abutment 170 adapted to be engaged by the abutment 130 to limit upward rocking motion of the arms 96 and 98. A limit switch LS5 is provided in position to be engaged by an adjustable abutment 174 carried by the stop block 168.

Associated with the gear finishing machine is a guide rail and stripper structure diagrammatically illustrated in Figure 1B at 176 and 178. This structure is shown in detail in Figures 15–17 and comprises a vertically extending plate 180 adapted to be bolted or otherwise secured to the table of the gear finishing machine and including forwardly extending brackets 182 and 184. Secured to the brackets 182 and 184 are vertically extending plates 186 and 188 respectively to which are secured guiding wings 190 and 192 respectively. The plates 186 and 188 carry forwardly extending blocks 194 and 196 respectively, at the forward edge of which are provided depending plates 198 and 200. Carried by the depending plates 198 and 200 are guiding wings 202 and 204. The adjacent edges of the guiding wings 190 and 192 are curved as indicated in Figure 15 and overlap the periphery of a work gear W a slight amount. These wings therefore act as strippers. This is necessary since the type of headstock employed ordinarily comprises an arbor adapted to enter the center opening in the work gear W and to engage it in tight frictional contact. Upon termination of the automatic operation the arbor is withdrawn and the wings 190 and 192 constitute stripping abutments. Otherwise, the wings 190 and 192, 202 and 204 constitute a guiding troughway to assist in supporting the gears against lateral displacement from the carrying arms during their movement from the loading chute to the receiver chute.

The operation of the mechanism is believed apparent from the foregoing but will be briefly described. With the gears in the loading chute as illustrated in Figure 1A, the foremost of these gears will be located in a definite predetermined preliminary loading position by engagement with the roller 52. At this time the slide 90 will be to the left and the arms 96 and 98 rocked downwardly to a position in which they clear the lower portions of gears located in working or unloading position. Air cylinder 38 is now operated in a direction to rock the arms upwardly bringing the loading arm 96 into engagement with the gear. The lever arm 102 also engages the gear W and due to the action of the spring 108 it provides a frictional contact opposing rotation of the gear W with a predetermined resistance. At this time the slide 90 is traversed to the right to bring the gear carried by the arm 96 to the loading position directly adjacent the tool T. The path of movement of the gear W is such that the portions of its teeth adjacent the tool T move tangentially with respect thereto. Thus, ordinarily the teeth of the gear and tool enter into properly meshed relation. However, in the event that the teeth of the gear and tool fail to mesh on initial contact, the arm 96 will rock downwardly about the pivot pin 100 and compress the spring 132 a slight amount. This will have the result of establishing a force tending to move the gear W into mesh with the teeth. At the same time since rotation of the gear W is opposed by the spring action of the lever arm 102, the teeth of the gear will be caused to slip over the top of the teeth of the tool into mesh. When this is accomplished lever arm 96 rocks upwardly under influence of spring 132, thus establishing fully meshed condition.

If a gear were in the working position at this time it will be appreciated that the unloading arm 98 will have moved upwardly, engaged the gear in supporting relation, and advanced it to the open end of the receiver chute 62.

When the parts reach this position automatic means actuate the headstock to pick up the work gear and to support it rigidly for the machining operation. As soon as the work gear has thus been supported by the work supporting means, arms 96 and 98 are rocked downwardly leaving the work gear in working position and depositing the finished gear in the open end of the receiver chute. The slide 90 is thereupon traversed to the left in position to repeat the operation. The automatic cycle includes actuation of air cylinder 50 to release the next succeeding work gear for movement into the preliminary position determined by its engagement with the roller 52.

Referring now to Fig. 18, there is illustrated an arrangement taking advantage of the present automatic loading devices for effecting full automatic operation of a battery of gear finishing machines. Such an operation may be desirable when the gears under consideration are cluster gears comprising two or more gears requiring independent shaving operations.

As seen in this figure, the gear finishing machine 10 is supplied with the supply chute 22 and receiver chute 60. The second machine indicated at 210, is provided with a supply chute 212 which may be identical with the supply chute 22 previously described with the exception that the sizing gauge 34 preferably is omitted. The supply chute 212 of the second machine 210 is provided with a supporting bracket 214 to which is pivoted a lifting arm or lever 216 which is adapted to underlie the discharge end of the receiver chute 60 of the first machine. A suitable power device 218, which may be in the form of an air cylinder, includes a piston connected by a connecting rod 220 to the lifting lever 216. It will be appreciated that the discharge end of the receiver chute 60 has a slotted or open bottom wall so that as the lever 216 is rocked in clockwise direction, as seen in the figure, it lifts the work piece W from the receiver chute 60 and deposits it in the left or upper end of the supply chute 212. Actuation of the air cylinder 218 is of course brought into the automatic cycling and the result is that a gear initially placed in the supply chute 22 of the machine 10 is thereafter automatically advanced to working position, shaved, delivered to the receiver chute 60, transferred to the supply chute 212, advanced to shaving position, shaved, and thereafter delivered to the receiver chute 222 of the second machine. Obviously, if desired, any required number of machines could be arranged in sequence to perform the necessary operations.

It is also within the contemplation of the present invention that the means for depositing a partially finished gear in the supply chute of the second machine may include mechanism for swinging the unloading arm 98 clockwise from its position seen in Figure 1B, which will permit substantial raising of the gear and thus will permit a greater inclination to the supply chute. At the same time it is within the contemplation of the present invention that independent elevating means may be provided which will receive a partially finished gear from the unloading arm 98 and thereafter raise it and deposit it in the inlet end of the supply chute. Finally, it is within the contemplation of the present invention that an elevator may be employed for receiving a gear from the unloading arm 98, raising it the required amount to deposit it in the inlet end of the second supply chute, and simultaneously effecting 180 degrees rotation thereof about a vertical axis so as to position a desired one of a cluster of gears in proper relationship to the finishing tool on the second machine.

While in the present disclosure reference has been made to the limit switches employed in the circuit for carrying out the automatic cycling of the machine, the circuit itself is not shown since any desired electric circuit for carrying out the sequential operations may be employed. It is noted however, that the limit switches associated with the automatic loading equipment comprise the following: Limit switch LS1 is located to be tripped upon completion of movement of the slide 90 to the right. Limit switch LS5 is positioned to be operated upon completion of movement of the slide 90 to the left. Limit switch LS3 is positioned to be actuated when the loading and unloading arms are in elevated gear engaging position. Limit switch LS4 is in position to be engaged when the loading and unloading arms reach their lower or clearance position. Limit switch LS2 is positioned to be held open to interrupt further automatic cycling of the machine when the receiver chute is filled. In addition to these limit switches the automatic cycling circuit includes switches for controlling actuation of the gear supporting means in the working position.

The automatic operation is carried out through fluid cylinders, preferably air cylinders, which includes the air cylinder 164 for effecting reciprocation of the slide, the air cylinder 138 for effecting raising and lowering of the arms 96 and 98, and the air cylinder 50 for effecting advance of work gears in the supply chute 22.

The drawings and the foregoing specification constitute a description of the improved gear finishing equipment in such full, clear, concise and exact terms as to enable any person skilled in the art to practice the invention, the scope of which is indicated by the appended claims.

What I claim as my invention is:

1. Transfer mechanism for use with a gear shaving machine of the type comprising a gear-like finishing tool, work gear supporting means movable to engage and release a work gear previously positioned in working position in meshed engagement with said tool, and supporting structure for said tool and gear supporting means arranged to provide space for movement of the work gear in the same direction in substantially straight line relationship from a preliminary position spaced laterally from said tool to a working position in mesh with said tool, in which movement of the gear into mesh with the tool is tangential with respect thereto, and then to an unloaded position beyond said tool, said mechanism comprising means for supporting a gear in said preliminary position with its axis perpendicular to said direction of movement, a receiver at said unloaded position for receiving a finished work gear, and loading mechanism movable in the said direction comprising a first carrier to advance a gear from preliminary to working position and a second carrier to advance a gear from working position to unloaded position, said loading mechanism comprising a slide mounted for back and forth reciprocation in said direction, said first carrier comprising a yieldable support positioned to advance the work gear tangentially of said tool to cause the teeth of the gear and tool to mesh, said yieldable support comprising an arm pivoted to said carrier, a lever pivoted to said arm, said arm and lever including surfaces shaped to engage the periphery of the work gear, resilient means biasing said lever relative to said arm to cause said arm and lever to frictionally grip the periphery of the work gear, and resilient means yieldingly opposing the movement of said arm which results if the gear and tool fail to mesh on initial contact.

2. Automatic loading equipment for a gear finishing machine having a working station including gear-like finishing tool and work gear supporting means movable to engage and release a work gear properly located at said station in mesh with the tool, said equipment comprising a supply chute and a receiver chute in substantial longitudinal alignment and spaced apart at opposite sides of the working station, means on said supply chute releasably positioning a work gear in a definite preliminary position, a slide beneath said chutes reciprocable between the adjacent ends of said chutes, a pair of movable gear supporting devices on said slide movable vertically to engage gears in said preliminary position and at said working station, means for moving said slide to advance said gears in substantially straight line relationship respectively to said working station and said receiver chute, and means for moving said devices downwardly to release said gears.

3. Structure as defined in claim 2 in which said devices comprise a pair of arms pivoted to said slide for vertical swinging movement.

4. Structure as defined in claim 3 in which the means for moving said arms comprises a power unit on said slide, and means connecting said power unit to both of said arms.

5. Structure as defined in claim 3 in which the means for moving said arms comprises a power unit on said slide, means for connecting said power unit to one of said arms, and a link connecting said arms for simultaneous movement.

6. Automatic loading equipment for a gear finishing machine having a working station including gear-like finishing tool and work gear supporting means movable to engage and release a work gear properly located at said station in mesh with the tool, said equipment comprising a supply chute and a receiver chute in substantial longitudinal alignment and spaced apart at opposite sides of the working station, means on said supply chute releasably positioning a work gear in a definite preliminary position, a slide reciprocable between the adjacent ends of said chutes, a pair of movable gear supporting devices on said slide engageable with gears in said preliminary position and at said working station, means for moving said slide to advance said gears respectively to said working station and said receiver chute in substantially straight line relationship, and means for moving said devices to release said gears, the adjacent ends of said chutes being open at the bottom, and said devices comprising arms movable vertically through the open bottom of said chutes to engage a gear or to release a gear.

7. Automatic loading mechanism for a gear finishing machine of the type comprising a rotary gear-like finishing tool, and a rotary work support below and adjacent said tool for engaging and releasing a work gear in working position properly meshed with said tool, said mechanism comprising a supply chute for receiving a supply of gears, means in said chute for locating the foremost gear therein in definite loading position, a slide located below said chute and work support, a pair of devices on said slide shaped to engage the lower peripheral portion of gears and to support them for movement with said slide, said devices being spaced apart to engage a gear in loading position and a gear in working position, means for reciprocating said slide to move a gear in a straight line from loading to working position and to move a second gear in the same straight line away from working position, and means for raising and lowering said devices in timed relation to reciprocation.

8. Mechanism as defined in claim 7 in which said devices comprise arms pivoted for vertical movement to said slide.

9. Mechanism as defined in claim 8 in which the means for raising and lowering said devices comprises a power unit carried by said slide and operatively connected to said arms.

10. Gear transfer mechanism comprising generally horizontally extending supply and receiver chutes having the adjacent ends thereof spaced apart to define a working space therebetween, a slide reciprocable beneath and in substantial parallelism with said chutes, a pair of gear supporting devices on said slide, said devices being spaced apart on said slide a distance approximately equal to one-half the spacing between gears carried by the adjacent ends of said chutes to move said devices between positions intermediate the ends of said chutes and positions underlying the ends of said chutes, means for reciprocating said slide a distance equal to the spacing between said devices, and power means automatically operable to raise and lower said devices in timed relation to reciprocation of said slide.

11. Mechanism as defined in claim 10 in which at least the adjacent end portions of said chutes have slots through which said devices are movable into and out of engagement with gears in said chutes.

12. Mechanism as defined in claim 11 in which said devices comprise generally horizontally extending arms pivoted adjacent the ends thereof, the free ends of said arms being movable substantially vertically.

13. Mechanism as defined in claim 12 comprising a spring pressed lever adjacent the free end of the arm adjacent said supply chute, said lever and said arm having portions shaped to engage the surface of a gear in frictional engagement.

14. Mechanism as defined in claim 12 in which the means for raising and lowering said devices comprises a lost motion connection to one of said arms, and spring means normally rendering said lost motion connection inoperable but yieldable to permit movement of said one arm if a gear carried thereby is forced out of its normal path of advance.

15. Gear transfer mechanism comprising first and second chute assemblies, each assembly comprising a supply section and a receiver section, the sections of each assembly being in substantial alignment and inclined downwardly at a small angle from the supply toward the receiver section, the sections of each assembly having their inner ends spaced apart to define a working space between adjacent ends thereof, the end of the supply section of said second chute assembly remote from the space between the sections of said second assembly being adjacent and elevated above the end of the receiver section of said first chute assembly, a slide reciprocable across the space between the supply and receiver section of each assembly, gear supporting devices on each slide spaced apart a distance approximately equal to one-half the spacing between gears carried at the ends of said chute sections adjacent said spaces, means for reciprocating said slides a distance approximately equal to one-half of the spacing between the devices carried thereby to move said devices between positions intermediate the adjacent ends of the chute sections of said chute assemblies, power means for raising and lowering said devices in timed relation to such reciprocation, and power means for raising a gear at the outer end of the receiver section of said first chute assembly and depositing it in the outer end of the supply section of said second chute assembly.

16. Mechanism as defined in claim 15 comprising automatic means for actuating said power means in timed relation to reciprocation of the slide movable across the space between the inner ends of the sections of said second chute assembly.

References Cited in the file of this patent

UNITED STATES PATENTS

| | | |
|---|---|---|
| Re.18,559 | Smith et al. | Aug. 9, 1932 |
| 835,525 | Hird | Nov. 13, 1906 |
| 937,259 | Neureuther | Oct. 19, 1909 |
| 953,752 | Neureuther | Apr. 5, 1910 |
| 1,765,825 | Cork | June 24, 1930 |
| 1,794,424 | Smith et al. | Mar. 3, 1931 |
| 1,841,988 | Smith et al. | Jan. 19, 1932 |
| 1,933,226 | Smith et al. | Oct. 31, 1933 |
| 2,004,540 | Smith et al. | June 11, 1935 |
| 2,692,535 | Praeg | Oct. 26, 1954 |

FOREIGN PATENTS

| | | |
|---|---|---|
| 60,584 | Switzerland | Mar. 20, 1912 |